US 8,165,743 B2

(12) United States Patent
Oyama

(10) Patent No.: US 8,165,743 B2
(45) Date of Patent: Apr. 24, 2012

(54) CONTROLLER FOR INVERTER

(75) Inventor: Katsuya Oyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1126 days.

(21) Appl. No.: 12/019,826

(22) Filed: Jan. 25, 2008

(65) Prior Publication Data
US 2008/0183361 A1 Jul. 31, 2008

(30) Foreign Application Priority Data

Jan. 31, 2007 (JP) ................................ 2007-020303

(51) Int. Cl.
*B60L 15/32* (2006.01)

(52) U.S. Cl. ..... 701/29.2; 701/34.3; 701/99; 180/65.21; 180/65.265; 180/65.28; 180/65.285; 180/65.8; 714/2; 714/48; 714/51; 714/55

(58) Field of Classification Search .............. 701/29, 701/33, 99; 180/65.1, 65.21, 65.265, 65.27, 180/65.28, 65.285, 65.29, 65.8; 903/902, 903/903, 905, 906; 714/2, 4.2, 10, 25, 47.1, 714/48, 51, 55
See application file for complete search history.

(56) References Cited

U.S. PATENT DOCUMENTS

| | | | | |
|---|---|---|---|---|
| 5,717,134 A * | 2/1998 | Schlichenmaier et al. | ...... | 73/121 |
| 6,321,150 B1 * | 11/2001 | Nitta | ............... | 701/29 |
| 6,487,998 B1 * | 12/2002 | Masberg et al. | ........... | 123/192.1 |
| 6,608,396 B2 * | 8/2003 | Downer et al. | .............. | 290/40 C |
| 6,885,920 B2 * | 4/2005 | Yakes et al. | ...................... | 701/22 |
| 7,002,352 B2 * | 2/2006 | Rogers et al. | ................. | 324/522 |
| 7,023,870 B2 * | 4/2006 | Poledna | ........................ | 370/423 |
| 7,095,191 B2 * | 8/2006 | Sakurai | ......................... | 318/139 |
| 7,117,965 B2 * | 10/2006 | Yatabe et al. | ............ | 180/65.235 |
| 7,154,236 B1 * | 12/2006 | Heap | ................................. | 318/9 |
| 7,220,212 B2 * | 5/2007 | Endo | .................................. | 477/3 |
| 7,236,337 B2 * | 6/2007 | Minatani | ......................... | 361/23 |
| 7,277,782 B2 * | 10/2007 | Yakes et al. | ..................... | 701/22 |
| 7,293,842 B2 * | 11/2007 | Bale et al. | ....................... | 303/20 |
| 7,317,978 B2 * | 1/2008 | Ashizawa et al. | ................ | 701/54 |
| 7,537,542 B2 * | 5/2009 | Cawthorne et al. | ................ | 477/3 |
| 7,937,194 B2 * | 5/2011 | Nasr et al. | ........................ | 701/22 |
| 2001/0027537 A1 | 10/2001 | Nada et al. | | |
| 2003/0173123 A1 | 9/2003 | Nakanowatari | | |
| 2004/0174125 A1 * | 9/2004 | Wilton et al. | .................. | 318/139 |
| 2006/0273592 A1 * | 12/2006 | Yamabuchi et al. | ........ | 290/40 C |
| 2007/0284162 A1 * | 12/2007 | Zettel et al. | .................. | 180/65.2 |

FOREIGN PATENT DOCUMENTS

| | | |
|---|---|---|
| EP | 1566303 | 8/2005 |
| EP | 1724915 | 11/2006 |
| JP | 10-289001 | 10/1998 |
| JP | 2001-312314 | 11/2001 |
| JP | 2005065392 A * | 3/2005 |
| JP | 2005-161961 | 6/2005 |
| JP | 2005-261041 | 9/2005 |
| WO | 2007/005629 | 1/2007 |

* cited by examiner

*Primary Examiner* — Thomas Black
*Assistant Examiner* — Peter D Nolan
(74) *Attorney, Agent, or Firm* — Mattingly & Malur, PC

(57) ABSTRACT

A high-reliability controller for inverter is provided with a simple configuration. The controller for inverter includes a CPU 14 controlling energy of a vehicle, a CPU 15 controlling a power generation amount or an assist amount of a first motor 26, a CPU 16 controlling a power generation amount or an assist amount of a second motor 27, a regulator 8 generating power supplied to the CPUs 14, 15 and 16, a first inverter 23 controlled by the CPU 15, a second inverter 24 controlled by the CPU 16, and a communication line 17 that connects the CPUs 14 to 16. The first inverter 23 and the second inverter 24 are controlled in a cooperative or an independent manner.

16 Claims, 6 Drawing Sheets

CONTROLLER FOR INVERTER

BACKGROUND OF THE INVENTION

1. Field of the Invention

The present invention relates to controllers for inverters and more particularly to a controller for an inverter provided with fail-safe means at the time of a detected failure.

2. Background Art

For a controller for an inverter (hereinafter this may be called an inverter controller also), it is necessary to improve the reliability of a system. Particularly, in the case of a cooperation control system including a plurality of processing units, a fail-safe function at the time of a failure detected in a processing unit, for example, is important.

In order to improve the reliability of the system, JP Patent Publication (Kokai) No. 10-289001 A (1998) discloses a control system as a redundant system including a main controller and a sub-controller therein. The provision of the sub-controller improves the reliability of the system when something abnormal occurs in the main controller.

SUMMARY OF THE INVENTION

In the configuration of JP Patent Publication (Kokai) No. 10-289001 A (1998), however, since it has a redundant configuration including the main controller and the sub-controller, a plurality of controllers are required, thus leading to a problem of making the control system huge in size and increasing the cost.

Thus, it is necessary to improve the reliability of the system with a simple configuration even at the time of a failure detected in a processing unit or the like.

A typical controller for an inverter of the present invention includes: an energy management processing unit that controls energy of a vehicle; a first motor control processing unit that controls a power generation amount or an assist amount of a first motor; a second motor control processing unit that controls a power generation amount or an assist amount of a second motor; a power supply unit that generates power supplied to the energy management processing unit, the first motor control processing unit and the second motor control processing unit; a first inverter that is controlled by the first motor control processing unit; a second inverter that is controlled by the second motor control processing unit; and a communication line that connects the energy management processing unit, the first motor control processing unit and the second motor control processing unit. The first inverter and the second inverter are controlled in a cooperative or an independent manner.

Another typical controller for an inverter of the present invention includes: a first inverter that drives a first motor; a second inverter that drives a second motor; a first processing unit (MCP1) that outputs a first signal (PWM signal) to control the first inverter; a second processing unit (MCP2) that outputs a second signal (PWM signal) to control the second inverter; and a connection line that connects the first processing unit and the second processing unit. If an abnormality is detected in the first processing unit, control of the first inverter based on the first signal is stopped, and control of the second inverter based on the second signal is continued.

EFFECTS OF THE INVENTION

In accordance with the present invention, a high-reliability controller for an inverter can be provided with a simple configuration.

DESCRIPTION OF PREFERRED EMBODIMENTS OF THE INVENTION

In the following, embodiments of the invention are described in detail with reference to the drawings.

Embodiment 1

Figure 1:
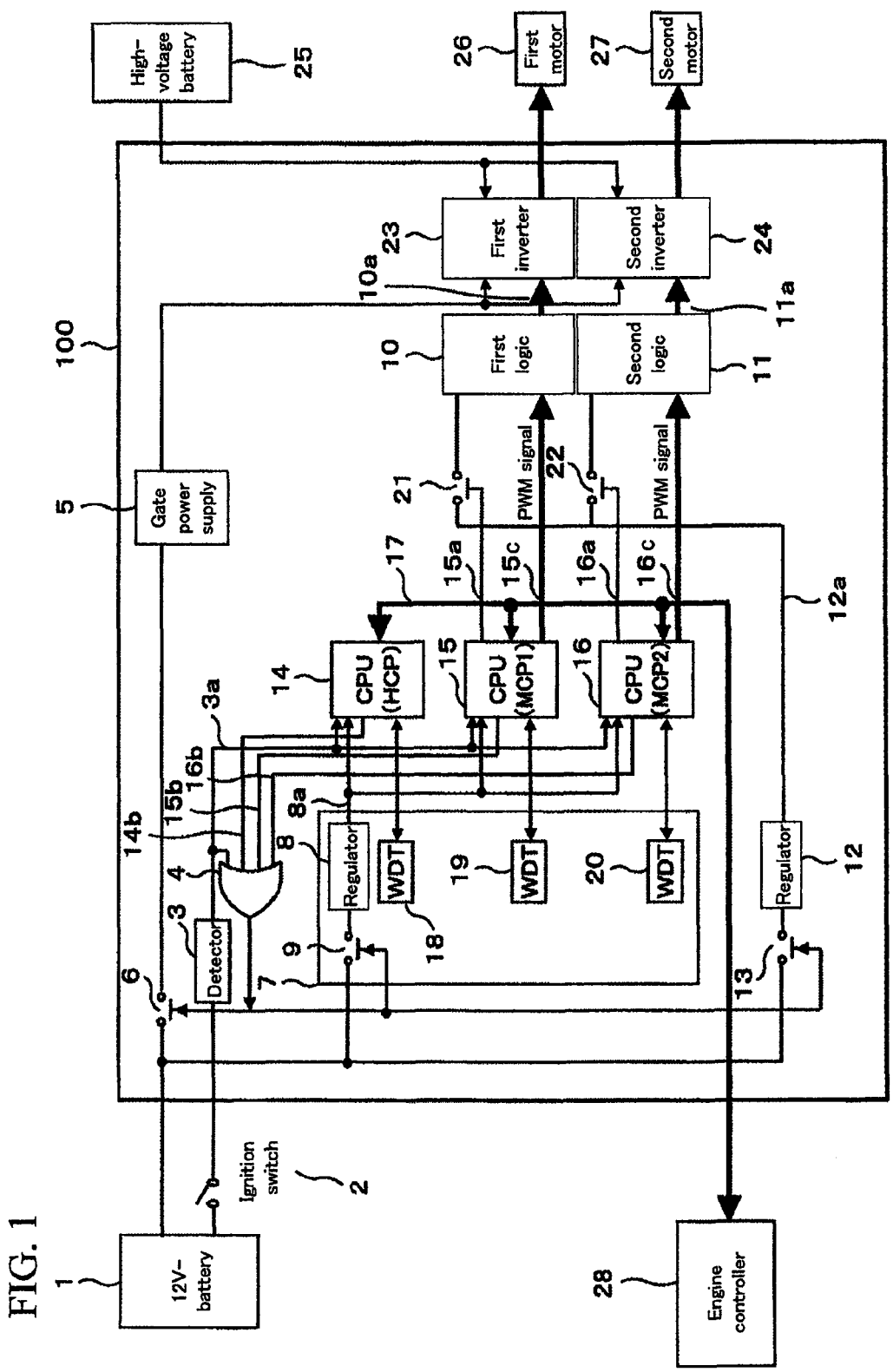
FIG. 1 shows the configuration of a system using an inverter controller according to Embodiment 1.

FIG. 1 shows the configuration of a system of the present invention.

Reference numeral 1 denotes a 12V-battery, which supplies a constant voltage around 12V to an inverter controller 100. Reference numeral 2 denotes an ignition switch. When a user turns the ignition switch 2 ON, electricity is supplied from the 12V-battery 1 to the inverter controller 100, so that the inverter controller 100 starts to operate.

Reference numeral 3 denotes a detector for the ignition switch 2, which makes a judgment of ON/OFF of the ignition switch 2. When the ignition switch 2 turns ON, the detector 3 outputs HIGH as a detection signal 3a to an OR gate 4. Via the OR gate 4, a switch 6 of a gate power supply 5, a switch 9 of a regulator 8 in an intra-inverter power supply 7, and a switch 13 of a regulator 12 of a first logic 10 and a second logic 11 are turned ON so as to activate the gate power supply 5, the regulator 8 and the regulator 12, whereby the inverter controller 100 operates.

Herein, the OR gate 4 is configured so as to receive, as input, the detection signal 3a output from the detector 3 for the ignition switch 2 and power-hold signals 14b, 15b and 16b which are output from a CPU 14 (HCP: Hybrid Control Processor), a CPU 15 (MCP1: Motor Control Processor 1) and a CPU 16 (MCP2: Motor Control Processor 2), respectively. These four signals of the detection signal 3a and the power-hold signals 14b, 15b and 16b enable the control of the power supply.

Note that the CPU 14 is an energy management processing unit for performing hybrid integration control, the CPU 15 is a first motor control processing unit for controlling a first motor 26 and the CPU 16 is a second motor control processing unit for controlling a second motor 27.

The detection signal 3a from the detector 3 for the ignition switch 2 is input also to the CPU 14, the CPU 15 and the CPU 16. With this configuration, the CPUs 14, 15 and 16 can detect the state of the ignition switch 2. When the detection signal 3a from the detector 3 for the ignition switch 2 is HIGH, the CPUs 14, 15 and 16 output the power-hold signals 14b, 15b and 16b, respectively, to the OR gate 4.

In the present embodiment, a voltage 8a generated at the regulator 8 is input to the CPUs 14, 15 and 16, which functions as a power supply of the respective CPUs.

The CPUs 14, 15 and 16 are connected via a communication line 17. The communication line 17 allows the CPUs to communicate with each other. The communication line 17 is further connected with an external controller of the inverter controller 100, e.g., with an engine controller 28, so that the engine controller 28 can communicate with the CPUs 14, 15 and 16 mutually.

With the use of such a configured communication line 17, the inverter controller 100 does not internally include a host CPU for communication with the external controller. Therefore, the CPUs 14, 15 and 16 in the inverter controller 100 and the engine controller 28 can communicate directly with each other.

The CPUs 14, 15 and 16 and the engine controller 28 monitor each other via the communication line 17, thus enabling the detection of normality/abnormality of their functions individually.

Reference numerals 18 to 20 denote watchdog timers (WDTs). The WDTs 18, 19 and 20 monitor the CPUs 14, 15 and 16, respectively. That is, the CPUs 14, 15 and 16 are configured so as to monitor each other via the communication line 17 to detect the normality/abnormality, while being judged by the WDTs 18 to 20 about their normality/abnormality.

A voltage 12a generated at the regulator 12 is supplied to the first logic 10 and the second logic 11. Since there is a need to consider the fail-safe when an abnormality occurs, between the regulator 12 and the first logic 10 is provided a switch 21 for the first logic 10, and between the regulator 12 and the second logic 11 is provided a switch 22 for the second logic 11.

The switch 21 is for shutting off the power supply for the first logic 10. When something abnormal occurs in the CPU 15, an instruction value 15a shuts off the power supply of the first logic 10 so as to completely stop an instruction to a first inverter 23 at a latter stage. The switch 22 is for shutting off the power supply for the second logic 11. When something abnormal occurs in the CPU 16, an instruction value 16a shuts off the power supply of the second logic 11 so as to completely stop an instruction to a second inverter 24 at a latter stage.

Reference numeral 25 denotes a high-voltage battery. For instance, this may be a high-voltage power supply of 288V, and functions as a main power supply of the first inverter 23 and the second inverter 24.

An instruction value 10a from the first logic 10 is output for driving and controlling a power module (not illustrated) in the first inverter 23. A gate driving signal, which is for controlling a switching element such as an IGBT or a MOSFET included in the power module, is based on the power supplied from the gate power supply 5. Note here that across the power supply of the power module, i.e., between an anode and a cathode of a switching element making up upper arm/lower arm is applied a high-voltage power supplied from the high-voltage battery 25. This configuration allows the first motor 26 to be driven by the high-voltage battery 25 as a power supply, thus enabling driving at a large torque.

An instruction value 11a from the second logic 11 is output for driving and controlling a power module (not illustrated) in the second inverter 24. A gate driving signal, which is for controlling a switching element such as an IGBT or a MOSFET included in the power module, is based on the power supplied from the gate power supply 5. Note here that across the power supply of the power module, i.e., between an anode and a cathode of a switching element making up upper arm/lower arm is applied a high-voltage power supplied from the high-voltage battery 25. This configuration allows the second motor 27 also to be driven by the high-voltage battery 25 as a power supply, thus enabling driving at a large torque.

The first logic 10 is controlled by a PWM signal 15c output from the CPU 15, and the second logic 11 is controlled by a PWM signal 16c output from the CPU 16.

In a normal state, a hybrid-system vehicle to which the inverter controller 100 of the present embodiment is applied is subjected to the integration control by the CPU 14. This means that torque instruction values are transmitted to the CPU 15 and the CPU 16 via the communication line 17, so as to allow the CPU 15 to control the first motor 26 optimally and allow the CPU 16 to control the second motor 27 optimally. Further, a torque amount required for the engine is transmitted to the engine controller 28 via the communication line 17. Thus, the engine, the first motor 26 and the second motor 27 are subjected to the integration control, thus enabling the optimal control of the vehicle as a whole.

The following describes the sequence when the power supply is shut off.

When the ignition switch 2 turns OFF, the detector 3 for the ignition switch 2 detects that the ignition switch 2 has turned OFF. At this time, the detection signal 3a output from the detector 3 for the ignition switch 2 turns LOW, and such a detection signal 3a is input to the CPUs 14, 15 and 16.

When being informed that the ignition switch 2 has turned OFF, the CPUs 14, 15 and 16 start a key-off sequence. When the key-off sequence starts, the CPU 14 turns 14b LOW, the CPU 15 turns 15b LOW, and the CPU 16 turns 16b LOW.

When the OR gate 4 receives the detection signal 3a and all of the power-hold signals 14b, 15b and 16b that have turned LOW, all of the switch 6 for the gate power supply 5, the switch 9 for the regulator 8 in the intra-inverter power supply 7, and the switch 13 for the regulator 12 of the first logic 10 and the second logic 11 turn OFF. As a result, the gate power supply 5, the regulator 8 and the regulator 12 stop, whereby the inverter controller 100 stops.

Such an operation causes the electrical shut-off between the 12V-battery 1 and the inverter controller 100. Therefore, a dark current can be reduced, so that the consumption current of the 12V-battery 1 can be reduced.

Embodiment 2

Figure 2:
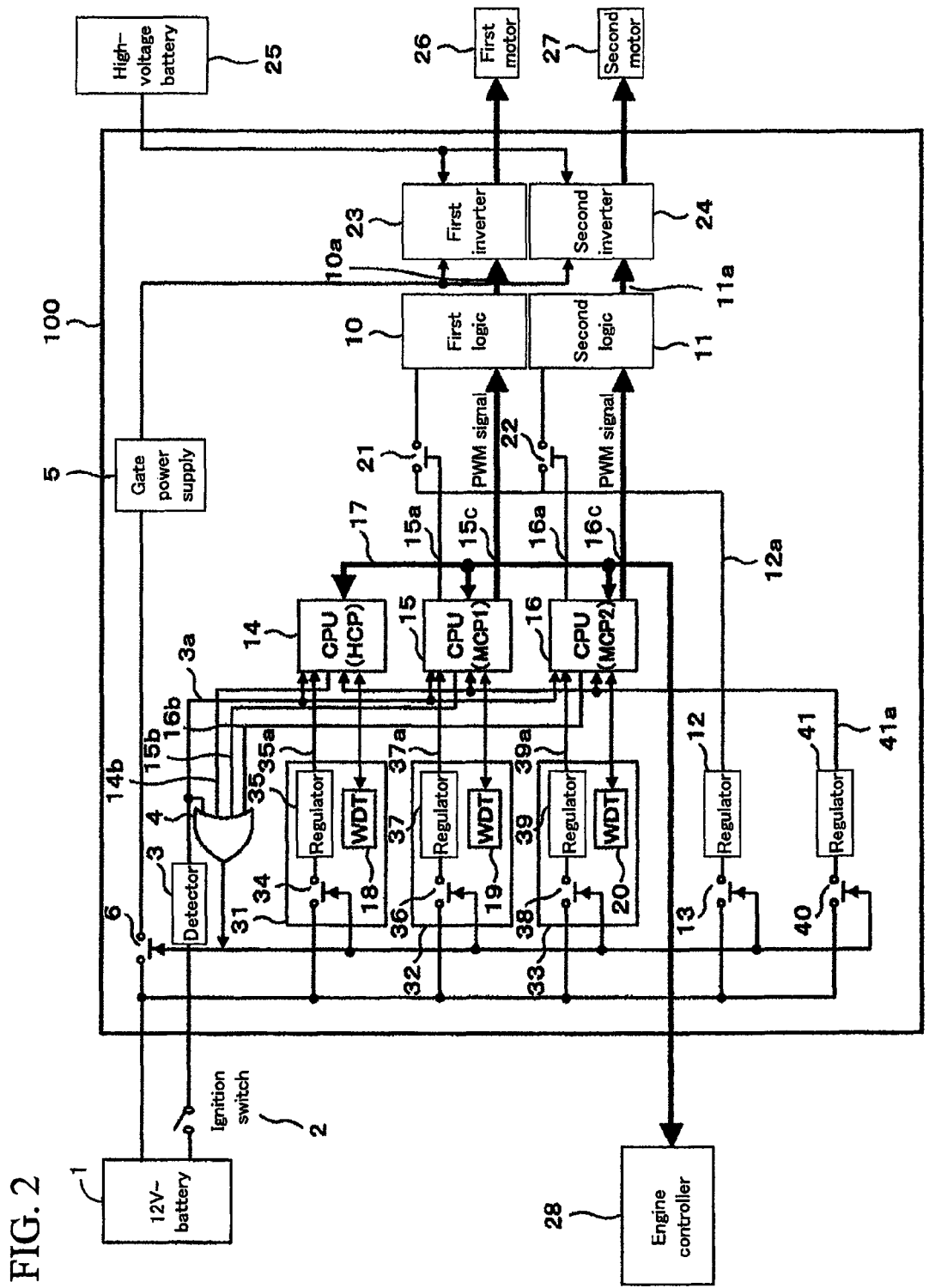
FIG. 2 shows the configuration of a system using an inverter controller according to Embodiment 2.

FIG. 2 shows the configuration of a system according to Embodiment 2 of the present invention.

A difference from the system configuration of FIG. 1 is that each of CPUs 14 to 16 of the present embodiment is provided with an independent power supply.

Reference numeral 31 denotes a power supply for the CPU 14. When an ignition switch 2 turns ON, a switch 34 for a regulator 35 included in the power supply 31 turns ON, so that power 35a is applied to the CPU 14. Reference numeral 32 denotes a power supply for the CPU 15. When the ignition switch 2 turns ON, a switch 36 for a regulator 37 included in the power supply 32 turns ON, so that power 37a is applied to the CPU 15. Reference numeral 33 denotes a power supply for the CPU 16. When the ignition switch 2 turns ON, a switch 38 for a regulator 39 included in the power supply 33 turns ON, so that power 39a is applied to the CPU 16.

As stated above, although the present embodiment is different from Embodiment 1 in that the power supplies are independently provided to the CPUs 14, 15 and 16, the basic operation is similar to that of Embodiment 1.

Another difference from FIG. 1 is the addition of a switch 40 and a regulator 41. The switch 40 of the regulator 41 also is controlled by the OR gate 4 in a similar manner to Embodiment 1. Output 41a of the regulator 41 is a constant voltage that is commonly input to the CPUs 14, 15 and 16.

The CPU 14 sets the output 41a of the regulator 41 as a reference voltage of a first AD converter. This first AD converter AD-converts output 35a of the regulator 35.

The CPU 15 sets the output 41a of the regulator 41 as a reference voltage of an AD converter. This AD converter AD-converts output 37a of the regulator 37.

The CPU 16 sets the output 41a of the regulator 41 as a reference voltage of an AD converter. This AD converter AD-converts output 39a of the regulator 39.

In this way, the results of the AD conversion by the CPUs 14, 15 and 16 are mutually communicated via the communication line 17, whereby the output voltages of the output 35a of the regulator 35, the output 37a of the regulator 37 and the output 39a of the regulator 39 can be diagnosed.

On the contrary, the CPU 14 sets the output 35a of the regulator 35 as a reference voltage of a second AD converter. This second AD converter AD-converts the output 41a of the regulator 41.

The CPU 15 sets the output 37a of the regulator 37 as a reference voltage of an AD converter. This AD converter AD-converts the output 41a of the regulator 41.

The CPU 16 sets the output 39a of the regulator 39 as a reference voltage of an AD converter. This AD converter AD-converts the output 41a of the regulator 41.

In this way, the results of the AD conversion by the CPUs 14, 15 and 16 are mutually communicated via the communication line 17, whereby the output voltage of the output 41a of the regulator 41 can be diagnosed.

The above-stated two AD function diagnoses allow the CPUs 14, 15 and 16 to diagnose the respective regulator output voltages. Further, as an additional function, the respective AD converter functions of the CPUs 14, 15 and 16 can be diagnosed, so that a high-reliability system can be provided.

(When the CPU 14 is in an Abnormal State)

Figure 3:
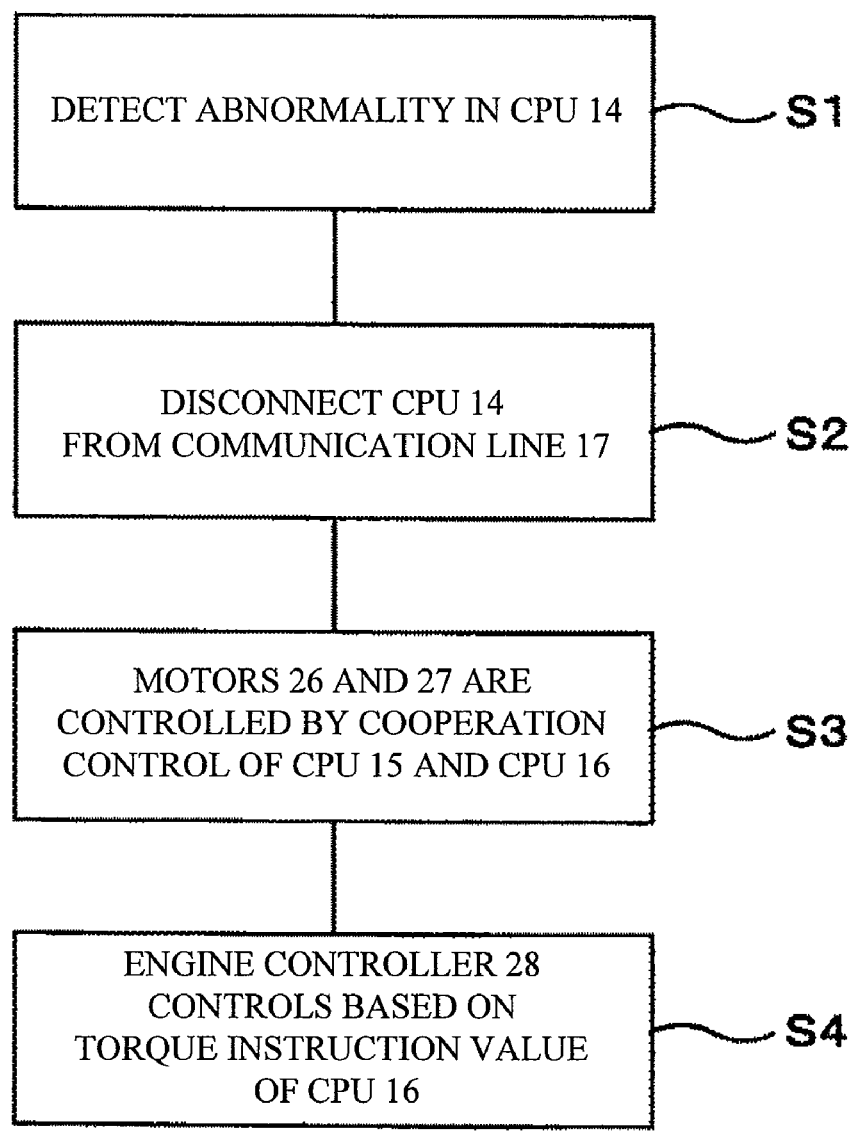
FIG. 3 shows the fail-safe function when a CPU 14 is in an abnormal state.

FIG. 3 shows the fail-safe function when the CPU 14 is in an abnormal state in Embodiment 1 or Embodiment 2.

At S1, the WDT 18, the CPU 15, the CPU 16 or the engine controller 28 detects that the function of the CPU 14 is in an abnormal state.

When an abnormality is detected in the CPU 14, then at S2 the CPU 14 is disconnected from the communication line 17 by software, and then the subsequent vehicle control is continued so that the CPU 14 does not intervene in the following data communication.

At S3, the CPU 15 and the CPU 16 continuously control the first motor 26 and the second motor 27, respectively. However, since the integration control by the CPU 14 is disabled, the cooperation control is performed between the CPU 15 and the CPU 16.

For instance, the first motor 26 may function as a generator and the second motor 27 may function as a vehicle-assist motor, where the amount of power generated in the vehicle and the amount of the vehicle assist are made to cooperate, so as to allow the optimum control of the remaining amount in the high-voltage battery 25.

At S4, the CPU 16 controlling the vehicle-assist motor transmits the torque instruction value that indicates the torque amount required for the engine to the engine controller 28 via the communication line 17. The engine controller 28 controls the engine based on the torque instruction value.

With this configuration, it is possible to use the high-voltage battery 25 effectively and perform cooperation control with the engine, thus achieving traveling with low-fuel consumption while making the travel distance as long as possible.

(When the CPU 15 is in an Abnormal State)

Figure 4:
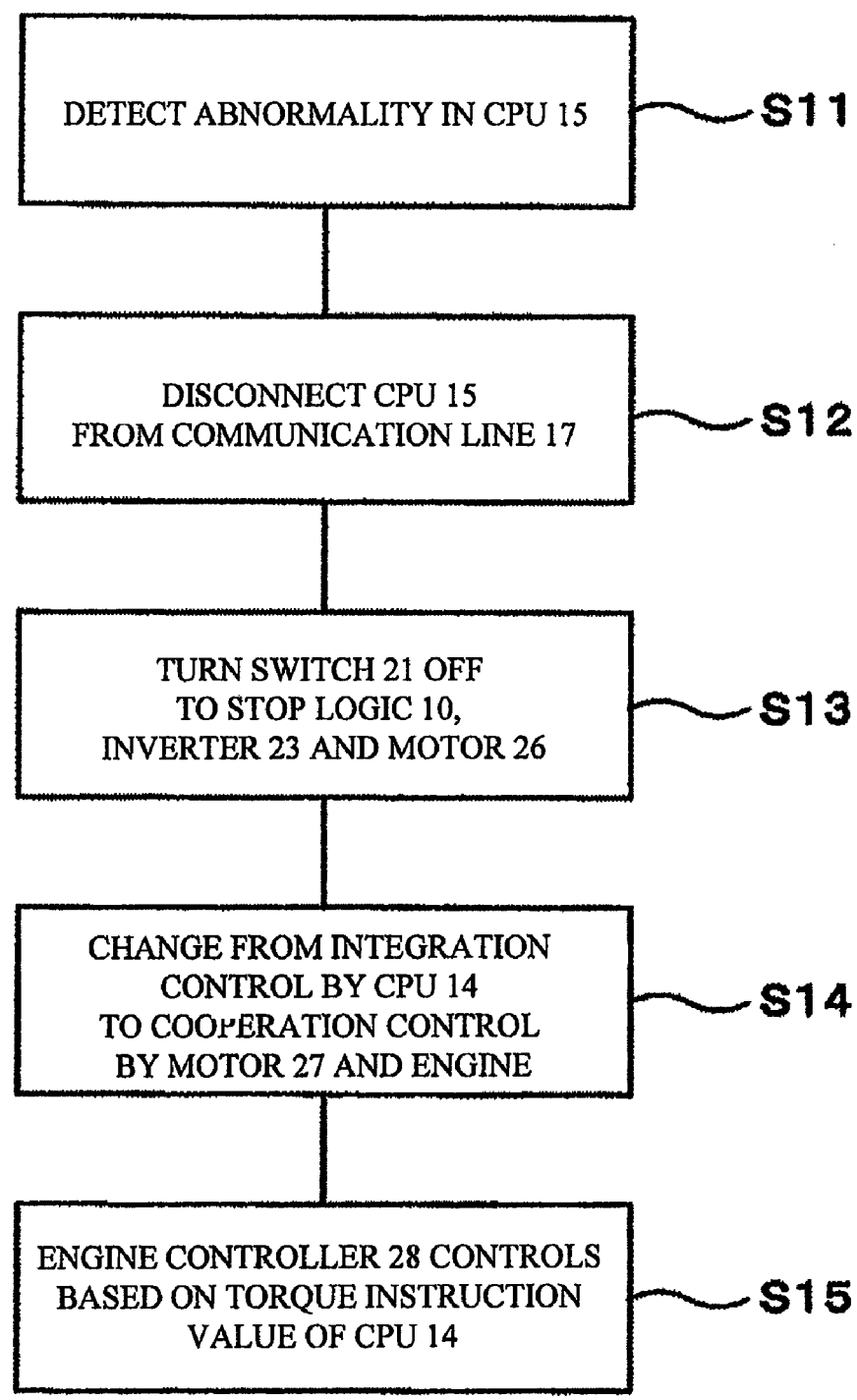
FIG. 4 shows the fail-safe function when a CPU 15 is in an abnormal state.

FIG. 4 shows the fail-safe function when the CPU 15 is in an abnormal state in Embodiment 1 or Embodiment 2.

At S11, the WDT 19, the CPU 14, the CPU 16 or the engine controller 28 detects that the function of the CPU 15 is in an abnormal state.

When an abnormality is detected in the CPU 15, then at S12 the CPU 15 is disconnected from the communication line 17 by software. The subsequent vehicle control is continued so that the CPU 15 does not intervene in the following data communication.

Next, at S13, the switch 21 is turned OFF so as to disconnect the first logic 10 and the first inverter 23, thus completely stopping the first motor 26. This function can prevent the abnormal operation of the first motor 26.

At S14, since the CPU 14 is for performing the integration control, the control of the hybrid system equipped with the inverter controller 100 is changed so as not to use the first motor 26. That is, the control with respect to the hybrid system with one motor is performed.

The CPU 14 changes the instruction value for the CPU 16 so that the second motor 27 functions as a vehicle-assist motor or a brake regenerative motor.

At S15, the engine controller 28 controls the engine optimally based on the torque instruction value from the CPU 14.

As a result of the above control, it is possible for the hybrid system of an engine and one motor to achieve the traveling with low-fuel consumption while making the travel distance as long as possible by the cooperation control.

(When the CPU 16 is in an Abnormal State)

Figure 5:
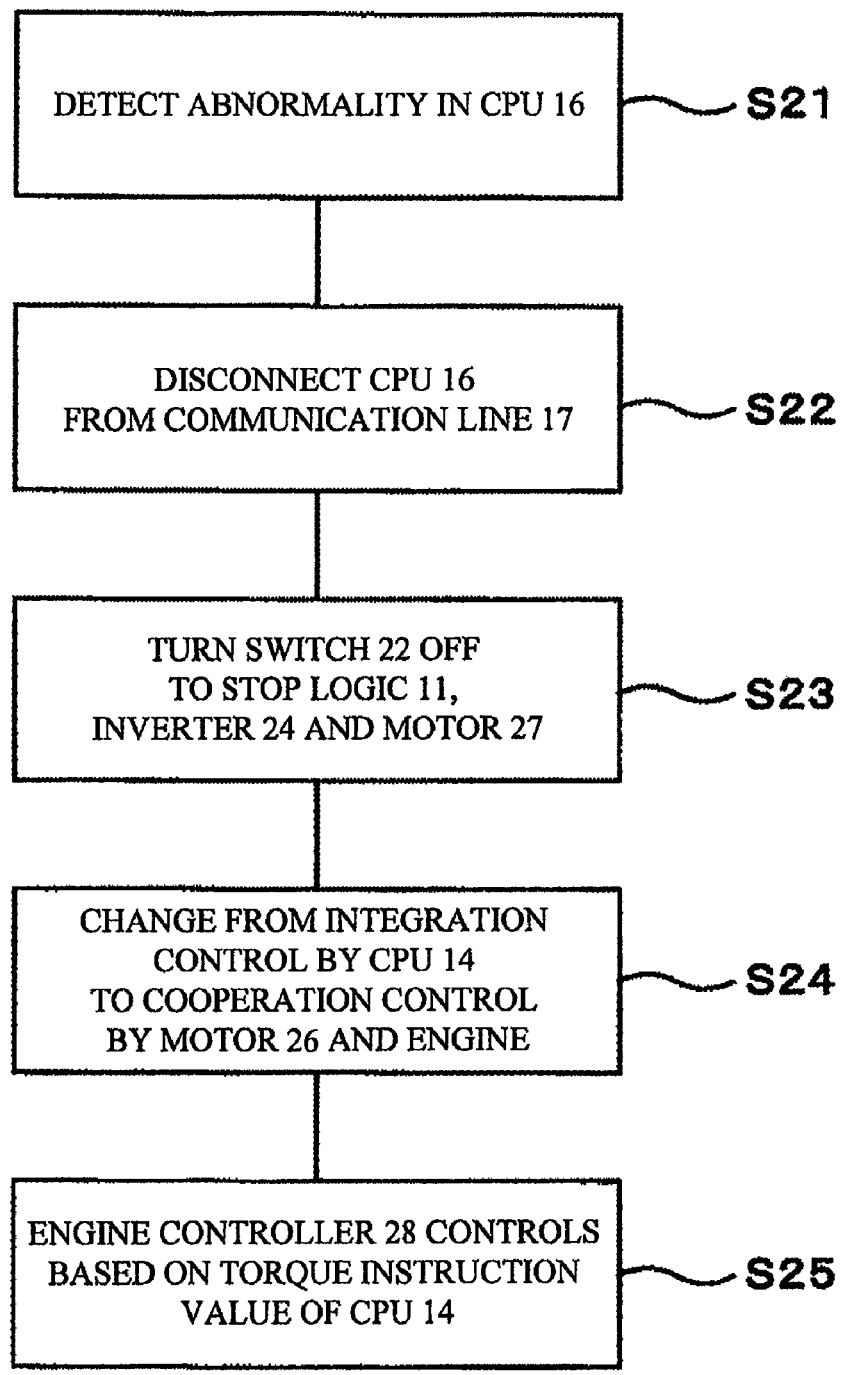
FIG. 5 shows the fail-safe function when a CPU 16 is in an abnormal state.

FIG. 5 shows the fail-safe function when the CPU 16 is in an abnormal state in Embodiment 1 or Embodiment 2.

At S21, the WDT 20, the CPU 14, the CPU 15 or the engine controller 28 detects that the function of the CPU 16 is in an abnormal state.

When an abnormality is detected, then at S22 the CPU 16 is disconnected from the communication line 17 by software. The subsequent vehicle control is continued so that the CPU 16 does not intervene in the following data communication.

Next, at S23, the switch 22 is turned OFF so as to disconnect the second logic 11 and the second inverter 24, thus completely stopping the second motor 27. This function can prevent the abnormal operation of the second motor 27.

At S24, since the CPU 14 is for performing the integration control, the control of the hybrid system equipped with the inverter controller 100 is changed so as not to use the second motor 27. That is, the control with respect to the hybrid system with one motor is performed.

The CPU 14 changes the instruction value for the CPU 15 so that the first motor 26 functions as a vehicle-assist motor or a brake regenerative motor.

At S25, the engine controller 28 controls the engine optimally based on the torque instruction value from the CPU 14.

As a result of the above control, it is possible for the hybrid system of an engine and one motor to achieve the traveling with low-fuel consumption while making the travel distance as long as possible by the cooperation control.

(When the Engine Controller is in an Abnormal State)

Figure 6:
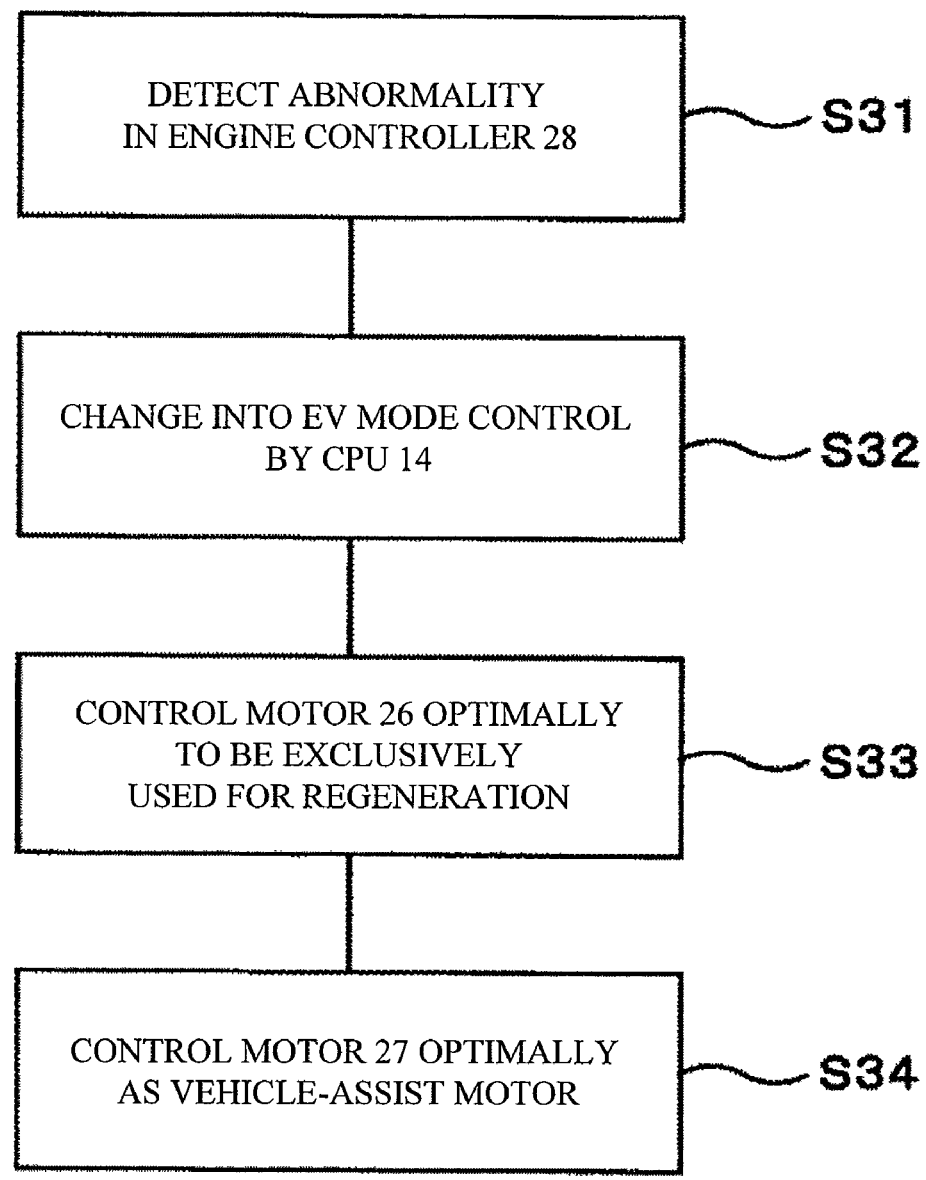
FIG. 6 shows the fail-safe function when an engine controller 28 is in an abnormal state.

FIG. 6 shows the fail-safe function when the engine controller 28 is in an abnormal state in Embodiment 1 or Embodiment 2.

At S31, the CPU 14, the CPU 15 or the CPU 16 detects via the communication line 17 that the engine controller 28 is in an abnormal state. The abnormality of the engine controller 28 causes the engine to stop. That is, since the engine function using gasoline or the like stops, the vehicle will be driven for operation by the high-voltage battery 25 only.

At S32, the CPU 14 changes the control into an electric vehicle mode (EV mode) where the high-voltage battery 25 only is used. In the EV mode, the continuous operation using the high-voltage battery 25 only is performed, and at the time when the capacity of the high-voltage battery 25 becomes lost, the vehicle will stop. Therefore, the control should be performed so that the assist control by the motor is at the maximum efficiency.

At S33, the CPU 15 controls, based on the instruction value of the CPU 14, the first motor 26 optimally to be exclusively used for the brake regeneration. Such control enables the optimum operation so as to charge the surplus energy in the assist into the high-voltage battery 25.

At S34, the CPU 16 controls, based on the instruction value of the CPU 14, the second motor 27 optimally to be exclusively used for the vehicle-assist. Such control allows the vehicle-assist to be performed with high efficiency and makes the best of the high-voltage battery 25, thus maximizing the vehicle-traveling distance.

The above embodiment describes the case where each of the CPUs 14, 15 and 16 and the engine controller 28 is in an abnormal state. However, when an abnormality occurs in a portion belonging to the same system as them, a similar fail-safe operation can be performed.

For instance, in the system of the CPU 14, the power supply 31 may be in an abnormal state. In this case, the fail-safe operation of FIG. 3 can be performed. In the system of the CPU 15, each of the power supply 32, the first logic 10, the first inverter 23 and the first motor 26 may be in an abnormal state. In this case, the fail-safe operation of FIG. 4 can be performed. In the system of the CPU 16, each of the power supply 33, the second logic 11, the second inverter 24 and the second motor 27 may be in an abnormal state. In this case, the fail-safe operation of FIG. 5 can be performed.

As the abnormal detection means, the AD converter function may be diagnosed based on the output 41a of the regulator 41.

If an abnormality of the AD converter of the CPU 14 is detected, the fail-safe function of FIG. 3 is carried out. If an abnormality of the AD converter of the CPU 15 is detected, the fail-safe function of FIG. 4 is carried out. If an abnormality of the AD converter of the CPU 16 is detected, the fail-safe function of FIG. 5 is carried out. Thereby, it is possible to perform the control so as to maximize the vehicle-traveling distance.

Although embodiments of the present invention have been described above, the scope of the present invention is not limited to the above embodiments, and the present invention may be modified variously without departing from the spirit or essential characteristics defined in the appended claims.

For instance, the above embodiments describe an inverter controller equipped with two inverters, which is not a limiting one. The present invention is applicable also to an inverter controller equipped with three or more inverters.

What is claimed is:

1. A controller for an inverter comprising:
   an energy management processing unit that controls energy of a vehicle;
   a first motor control processing unit that controls a power generation amount or an assist amount of a first motor;
   a second motor control processing unit that controls a power generation amount or an assist amount of a second motor;
   a power supply unit that generates power supplied to the energy management processing unit, the first motor control processing unit and the second motor control processing unit;
   a first inverter that is controlled by the first motor control processing unit;
   a second inverter that is controlled by the second motor control processing unit; and
   a communication line that connects the energy management processing unit, the first motor control processing unit and the second motor control processing unit,
   wherein the first inverter and the second inverter are configured so as to be controlled in a cooperative or an independent manner,
   the controller further comprising:
   a first logic portion that generates a control signal of the first inverter in accordance with the first motor control processing unit;
   a second logic portion that generates a control signal of the second inverter in accordance with the second motor control processing unit;
   a power supply unit for logic portion that generates power used for the first logic portion and the second logic portion;
   a gate power supply unit that is used for a driving signal of a switching element that is provided in each of the first inverter and the second inverter,
   wherein if an abnormality is detected in the first motor control processing unit, the first motor control processing unit shuts off power supplied from the power supply unit for logic portion to the first logic portion, and the second motor control processing unit makes the second inverter continue an operation, and
   wherein if an abnormality is detected in the energy management processing unit, communication is conducted between the first motor control processing unit and the second motor control processing unit, so as to continue operations of the first inverter and the second inverter.

2. The controller for inverter according to claim 1,
   wherein the communication line is further connected with an external engine controlling unit, and
   the engine controlling unit, the first inverter and the second inverter are configured so as to be controlled in a cooperative or an independent manner.

3. The controller for inverter according to claim 2,
   wherein the engine controlling unit, the energy management processing unit, the first motor control processing unit and the second motor control processing unit are configured so as to monitor each other, and
   if an abnormal state is detected in any one of the units, control of the vehicle is changed in a manner different from that in a normal state.

4. The controller for inverter according to claim 2, further comprising:
   a plurality of watchdog timers that detect a normal state/an abnormal state of the engine controlling unit, the energy management processing unit, the first motor control processing unit and the second motor control processing unit independently; and
   means that, if the abnormal state is detected, changes control of the vehicle in a manner different from that in a normal state.

5. The controller for inverter according to claim 4,
   wherein the plurality of watchdog timers are each provided to the energy management processing unit, the first motor control processing unit and the second motor control processing unit.

6. The controller for inverter according to claim 1, further comprising:
   a detector for an ignition switch that makes a judgment of ON/OFF of the ignition switch; and means that electrically disconnects the power supply unit and an external battery, wherein the electrically disconnecting means is controlled by the detector, the energy management processing unit, the first motor control processing unit and the second motor control processing unit.

7. The controller for inverter according to claim 1, wherein the power supply unit generates a reference voltage that is input commonly to the energy management processing unit, the first motor control processing unit and the second motor control processing unit, and by mutually confirming the reference voltage generated by the power supply unit, AD conversion functions of the energy management processing unit, the first motor control processing unit and the second motor control processing unit are diagnosed.

8. The controller for inverter according to claim 1, wherein if an abnormality is detected in the second motor control processing unit, the second motor control processing unit shuts off power supplied from the power supply unit for logic portion to the second logic portion, and the first motor control processing unit makes the first inverter continue an operation.

9. A controller for an inverter comprising:

an energy management processing unit that controls energy of a vehicle;

a first motor control processing unit that controls a power generation amount or an assist amount of a first motor;

a second motor control processing unit that controls a power generation amount or an assist amount of a second motor;

a power supply unit that generates power supplied to the energy management processing unit, the first motor control processing unit and the second motor control processing unit;

a first inverter that is controlled by the first motor control processing unit;

a second inverter that is controlled by the second motor control processing unit; and a communication line that connects the energy management processing unit, the first motor control processing unit and the second motor control processing unit, wherein the first inverter and the second inverter are configured so as to be controlled in a cooperative or an independent manner, the controller further comprising:

a first logic portion that generates a control signal of the first inverter in accordance with the first motor control processing unit;

a second logic portion that generates a control signal of the second inverter in accordance with the second motor control processing unit;

a power supply unit for logic portion that generates power used for the first logic portion and the second logic portion;

a gate power supply unit that is used for a driving signal of a switching element that is provided in each of the first inverter and the second inverter, wherein if an abnormality is detected in the first motor control processing unit, the first motor control processing unit shuts off power supplied from the power supply unit for logic portion to the first logic portion, and the second motor control processing unit makes the second inverter continue an operation, and wherein an external engine controlling unit, the energy management processing unit, the first motor control processing unit and the second motor control processing unit are connected via the communication line so as to be controlled in a cooperative or an independent manner, and if an abnormality is detected in the engine controlling unit, operations of the first inverter and the second inverter are continued in accordance with the energy management processing unit, the first motor control processing unit and the second motor control processing unit.

10. The controller for inverter according to claim 9, wherein the engine controlling unit, the first inverter and the second inverter are configured so as to be controlled in a cooperative or an independent manner.

11. The controller for inverter according to claim 10, wherein the engine controlling unit, the energy management processing unit, the first motor control processing unit and the second motor control processing unit are configured so as to monitor each other, and if an abnormal state is detected in any one of the units, control of the vehicle is changed in a manner different from that in a normal state.

12. The controller for inverter according to claim 10, further comprising:

a plurality of watchdog timers that detect a normal state/an abnormal state of the engine controlling unit, the energy management processing unit, the first motor control processing unit and the second motor control processing unit independently; and means that, if the abnormal state is detected, changes control of the vehicle in a manner different from that in a normal state.

13. The controller for inverter according to claim 12, wherein the plurality of watchdog timers are each provided to the energy management processing unit, the first motor control processing unit and the second motor control processing unit.

14. The controller for inverter according to claim 9, further comprising:

a detector for an ignition switch that makes a judgment of ON/OFF of the ignition switch; and means that electrically disconnects the power supply unit and an external battery, wherein the electrically disconnecting means is controlled by the detector, the energy management processing unit, the first motor control processing unit and the second motor control processing unit.

15. The controller for inverter according to claim 9, wherein the power supply unit generates a reference voltage that is input commonly to the energy management processing unit, the first motor control processing unit and the second motor control processing unit, and by mutually confirming the reference voltage generated by the power supply unit, AD conversion functions of the energy management processing unit, the first motor control processing unit and the second motor control processing unit are diagnosed.

16. The controller for inverter according to claim 9, wherein if an abnormality is detected in the second motor control processing unit, the second motor control processing unit shuts off power supplied from the power supply unit for logic portion to the second logic portion, and the first motor control processing unit makes the first inverter continue an operation.

* * * * *